United States Patent [19]

Lee

[11] Patent Number: 5,653,396

[45] Date of Patent: Aug. 5, 1997

[54] APPARATUS FOR DETECTING ROTATIVE VELOCITY OF A REEL TABLE

[75] Inventor: Chang-Ho Lee, Seoul, Rep. of Korea

[73] Assignee: Daewoo Electronics Co., Ltd., Seoul, Rep. of Korea

[21] Appl. No.: 573,064

[22] Filed: Dec. 15, 1995

[30] Foreign Application Priority Data

Mar. 29, 1995 [KR] Rep. of Korea ............... 95-5865 U

[51] Int. Cl.$^6$ ........................................... G11B 15/46
[52] U.S. Cl. .................. 242/334.4; 242/534; 242/563
[58] Field of Search .................... 242/334.4, 412.1, 242/413.9, 421.4, 534, 563

[56] References Cited

U.S. PATENT DOCUMENTS

| | | | |
|---|---|---|---|
| 3,141,626 | 7/1964 | Hoskin | 242/334.4 |
| 3,343,761 | 9/1967 | Rotter | 242/413.9 |
| 3,598,330 | 8/1971 | Gotschewski | 242/563 |
| 3,815,847 | 6/1974 | Morell et al. | 242/334.4 |

FOREIGN PATENT DOCUMENTS

| | | | |
|---|---|---|---|
| 189424 | 5/1937 | Switzerland | 242/334.4 |

*Primary Examiner*—John P. Darling
*Attorney, Agent, or Firm*—Beveridge, DeGrandi, Weilacher & Young, LLP

[57] ABSTRACT

An apparatus for detecting rotative velocity of a reel table of a tape recorder continuously detects a rotational state of a reel table to provide data to a control section of a driving mechanism for automatically stopping the reel table when the reel table is not normally rotated, which includes a reel table installed on a deck of a tape recorder for being rotated in accordance with a driving of a driving motor to lead a travelling of a tape, a rotating unit formed to a lower plane of the reel table for being rotated dependently on the rotation of the reel table, and a switching unit for successively repeating connection and short operations in accordance with the rotation of the rotating unit, and providing the result as a pulse signal. Thus, fewer elements are needed to facilitate an assembling thereof, and the rotative velocity of the reel table can be detected by adopting a contact-type detecting system in place of the expensive optical detecting system.

7 Claims, 2 Drawing Sheets

FIG.1
(PROIR ART)
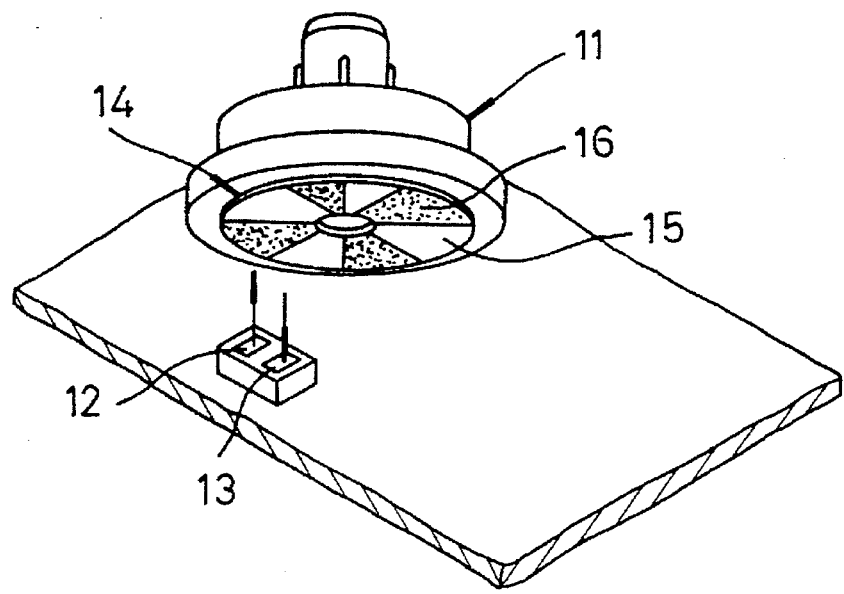
FIG.2 (PROIR ART)
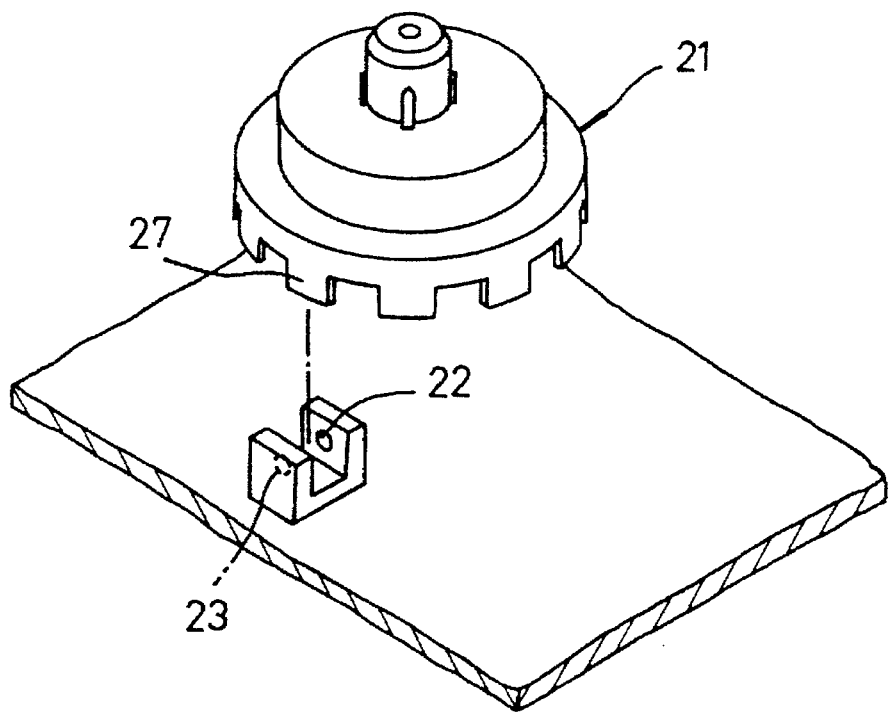

APPARATUS FOR DETECTING ROTATIVE VELOCITY OF A REEL TABLE

BACKGROUND OF THE INVENTION

1. Field of the Invention

The present invention relates to an apparatus for detecting the rotative velocity of a reel table, and more particularly to an apparatus for detecting the rotative velocity of a reel table of a tape recorder, in which a rotational state of a reel table is continuously detected for providing data to a control section of a driving mechanism to automatically stop the rotation of the reel table when the reel table is not normally rotated

2. Description of the Prior Art

Generally, tape recorders function for recording video and/or audio signals on a magnetic tape which travels along a tape travelling system, and reproducing the recorded signals. The magnetic tape is wound on a pair of wheels provided within a cassette. When the cassette is mounted onto a deck of the tape recorder in accordance with a loading mechanism, the pair of wheels are respectively mounted to a take-up reel and a supply reel installed on the deck. Upon the completion of the mounting, a predetermined travelling operation such as play, record, fast forward and rewind is carried out in accordance with a selected operation mode. At this time, the magnetic tape is released from one wheel to wind on the other wheel in accordance with the rotational direction of the take-up reel and the supply reel.

Meantime, the rotation of the take-up reel is probably obstructed by a defect of a deck mechanism or other factors during the travelling of the tape. Even under this state, the tape is continuously released in the direction of a head cylinder by a capstan, so that a slack of the tape occurs between the capstan and the head cylinder. If the cassette is ejected without realizing the occurrence of the tape slack, the tape is caught by surrounding elements within the tape recorder to be damaged, contaminated by grease coated on the surrounding elements or cut to be spoiled. In a video cassette tape, if a cassette unloading mechanism is carried out under the state of involving the tape slack, the tape is liable to be bitten between a cover and a chassis while the cover of the tape is closed.

Due to this fact, an apparatus for detecting the rotative velocity of the reel table is mounted on a lower end of the reel table to determine whether or not the reel table is normally rotated. Since the reel table is not normally rotated when the tape slack occurs, the apparatus for detecting the rotative velocity of the reel table detects the tape slack to provide data to a control section of a driving mechanism. The control section recognizing the slack forces to stop the rotation of the capstan and perform the eject or power-off operation.

FIG. 1 illustrates an apparatus of detecting the rotative velocity of the reel table according to one example of a conventional technique. A light emitting device 12 and a light receiving device 13 are arranged in parallel to each other on a lower portion of a reel table 11 spaced therefrom by a predetermined distance. A reflecting plate 14 formed with an alternately disposed reflection portion 15 and non-reflection portion 16 is installed to a lower plane of reel table 11.

If reel table 11 is rotated, light radiated from light emitting device 12 is reflected when reflection portion 15 of reflecting plate 14 places on an upper portion of light emitting device 12, so that light receiving device 13 receives the light. Whereas, when the non-reflection portion 16 places on the upper portion of light emitting device 13, light receiving device 13 cannot receive the light.

By this operation, a pulse is generated in view of an amount of the light monitored via light receiving device 13, and an interval between the pulses is constant in conformity with the rotative velocity of reel table 11. Therefore, the rotative velocity of the reel table is detected by measuring the interval of the pulses.

In the conventional apparatus for detecting the rotative velocity of the reel table, reflecting plate 14 is typically fabricated by a thin aluminum plate. Here, an upper portion of the thin aluminum plate corresponding to non-reflection portion 16 is printed with a black paint to be fabricated. Consequently, reflecting plate 14 is divided into reflection portion 15 consisting of the thin aluminum plate and non-reflection portion 16 of black color. Completely fabricated reflecting plate 14 is attached to the lower plane of reel table 11 by means of a both-sided tape.

The rotative velocity of reel table 11 is easily detected when utilizing reflecting plate 14 fabricated via the above-stated process, however, the number of elements is increased while complicating the fabricating process. In addition, it is burdensome to employ expensive light emitting device and light receiving device.

An apparatus for detecting the rotative velocity of the reel table according to another example of the conventional technique as shown in FIG. 2 does not utilize the reflecting plate considering the above-mentioned problems.

Here, a light emitting device 22 and a light receiving device 23 are opposed to be spaced from each other on a lower portion of a reel table 21. Also, a plurality of light shielding plates 27 protrude from reel table 21 on a lower plane thereof while being integrally formed with reel table 21, in which light shielding plates 27 are downwardly bent and regularly spaced along a circumference.

When light shielding plate 27 is placed between light emitting device 22 and light receiving device 23 while reel table 21 is rotated, light receiving device 23 cannot receive the light from light emitting device 22. Meantime, if a space between light shielding plates 27 is placed between light emitting device 22 and light receiving device 23, light receiving device 23 is permitted to accept the light from light emitting device 22.

By doing so, a pulse is produced in correspondence with the light sensed via light receiving device 23, and an interval of the pulse is varied in view of the rotative velocity of reel table 21. As the result, the rotative velocity of the reel table can be detected by measuring the pulses.

The above apparatus for detecting the rotative velocity of the reel table is simpler than the apparatus utilizing the reflecting plate, but employs the expensive light emitting device and light receiving device due to the optical detecting system like the apparatus as shown in FIG. 1. Therefore, it is burdensome on the economic basis. Furthermore, in actual practice, a distance between the light shielding plate and the sensors is narrow to heighten the rate of poor operation due to an inferior contact.

SUMMARY OF THE INVENTION

It is an object of the present invention considering the above-mentioned problems to provide a contact-type apparatus for detecting rotative velocity of a real table of a tape recorder capable of economizing manufacturing cost without utilizing an expensive light emitting device and light receiving device.

To achieve the above object of the present invention, there is provided an apparatus for detecting rotative velocity of a reel table, which includes a reel table installed on a deck of a tape recorder for being rotated in accordance with a driving of a driving motor to lead a travelling of a tape, a rotating means formed on a lower plane of the reel table for being rotated dependently on the rotation of the reel table and a switching means successively repeating connection and short operations in accordance with the rotation of the rotating means, providing the result as a pulse signal.

Preferably, the rotating means is a transmission gear for transmitting the rotation of the reel table as a circular motion.

If the rotating means is the transmission gear, the switching unit includes a rotor which is brought into meshing engagement with the transmission gear and is provided with a connecting projection having a plurality of contact points to one side thereof, and a stator formed with a plurality of connection patterns for successively executing connection with/or and short from the connecting projection in accordance with the rotation of the rotor. Here, it is preferable that the plane formed with the connecting projection of the rotor and the plane formed with the connection pattern of the stator are oppose to each other.

Furthermore, the rotor is formed with a fixing projection and the stator is formed with a fixing hole for fitting the fixing projection into the fixing hole, so that the rotor and stator are rotatably coupled with each other.

BRIEF DESCRIPTION OF THE DRAWINGS

The above object and other advantages of the present invention will become more apparent by describing in detail preferred embodiments thereof with reference to the attached drawings in which:

FIG. 1 is a view for showing a structure of one example of a conventional apparatus for detecting rotative velocity of a reel table;

FIG. 2 is a view for showing a structure of another example of the conventional apparatus for detecting the rotative velocity of the reel table;

DESCRIPTION OF THE PREFERRED EMBODIMENT

Respective elements and operational principle of an apparatus for detecting rotative velocity of a reel table according to the present invention will be described in detail with reference to the accompanying drawings.

Figure 3:
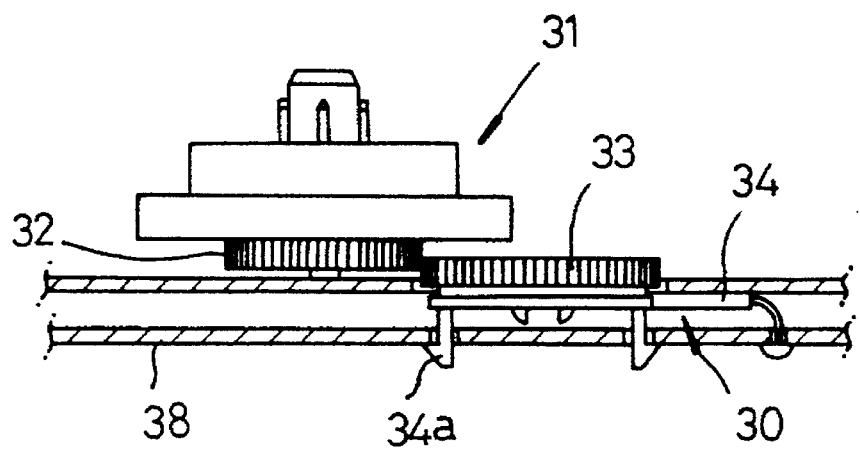
FIG. 3 is a view for showing a structure of an apparatus for detecting rotative velocity of a reel table according to one embodiment of the present invention.
Figure 4:
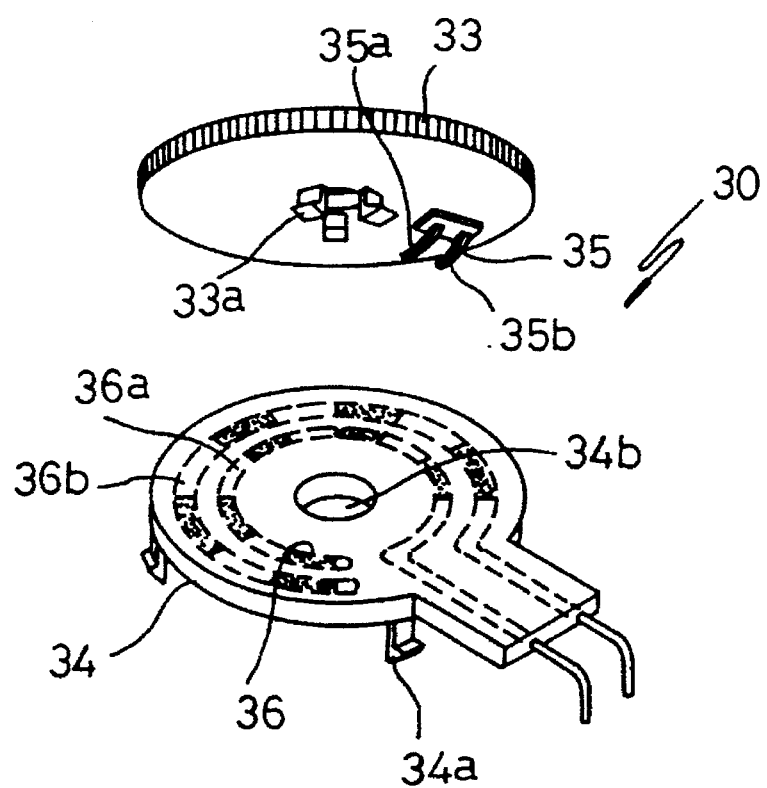
FIG. 4 is an exploded perspective view for showing the apparatus for detecting the rotative velocity of the reel table as shown in FIG. 3.

FIGS. 3 and 4 are a side view and an exploded perspective view for respectively showing the apparatus for detecting the rotative velocity of the reel table according to one embodiment of the present invention.

The apparatus is comprised of a transmission gear 32 integrally formed to a lower plane of a reel table 31, and a rotary switch 30 installed adjacently to transmission gear 32.

Rotary switch 30 includes a rotor 33, stator 34 and a connecting device between them. Rotor 33 is formed with a gear portion along an outer circumference thereof to be brought into meshing engagement with transmission gear 32 on a lower portion of reel table 31. Stator 34 is fixed to a substrate 38 on a lower portion of reel table 31 by means of a keeper 34a integrally formed to a lower portion of stator 34. A fixing projection 33a protrudes from the center of rotor 33, and stator 34 is provided with a fixing hole 34b. Thus, rotor 33 and stator 34 are joined in such a manner that rotor 33 is rotatable on stator 34.

The connecting device is comprised of a connecting projection 35 installed to one side thereof to have a plurality of contact points, and a connecting pattern 36 which is installed to the upper plane of stator 34 facing with rotor 33 provided with connecting projection 35 to be selectively connected with and/or short from the contact points of connecting projection 35 in accordance with a rotation angle of rotor 33.

A connecting mechanism according to the connecting device will be described in more detail.

Connecting projection 35 installed to the lower plane of rotor 33 has first and second contact points 35a and 35b, and connecting pattern 36 provided to the upper portion of stator 34 has circularly-shaped first and second patterns 36a and 36b corresponding to first and second contact points 35a and 35b, respectively. Ends of first and second patterns 36a and 36b are respectively connected to substrate 38 via a circuitry connection.

First and second patterns 36a and 36b are formed of a connection portion and a short portion which are connected with or short from first and second contact points 35a and 35b of connecting projection 35 in accordance with the rotational angle of rotor 33. The connection portion and short portion are alternately formed along the circumferential direction to produce a pulse signal resulting from the connection with and short from first and second contact points 35a and 35b. A microcomputer receives the pulse signal to detect whether the reel table is normally rotated or not.

The contact point of the connecting projection and the connection pattern on the stator corresponding thereto preferably number two as described above when considering the facility and effect in manufacturing, in which the number of the above elements may be increased as required.

In the apparatus for detecting the rotative velocity of the reel table constructed as above, once reel table 31 is rotated, transmission gear 32 formed to the lower plane of reel table 31 is rotated. Following to this, rotor 33 brought into meshing engagement with transmission gear 32 begins rotating. While rotor 33 is rotated, a high signal is generated when first and second contact points 35a and 35b of connecting projection 35 formed to the lower plane of rotor 33 are connected to the connection portion of connecting pattern 36 of stator 34. Also, a low signal is generated when the contact points of connecting projection 35 are placed to the short portion of connecting pattern 36 to be short. Since the connection and short are sequentially repeated, the high and low signals are repeatedly generated along with the rotation of rotor 33 by a prescribed time interval.

Consequently, the pulse signal is produced from rotary switch 30 in accordance with the rotative velocity of reel table 31, and the microcomputer receiving the produced pulse signal recognizes whether or not the reel table is normally rotated.

If a malfunction such as an irregular rotation of the reel table, a rotating operation in a stop mode or a stop operation in a rotation mode occurs, the state is notified as an irregular pulse signals from the rotary switch or a no pulse signal output from a currently-executed mode state. Thus, the microcomputer recognizes the current state as of the malfunction to instantly stop the rotation of the reel table, thereby preventing the damage upon the tape.

Preferably, the transmission gear is integrally formed with the reel table on the lower plane thereof, and the apparatus of detecting the rotative velocity of the reel table may be provided to either one or both of the take-up reel and the supply reel.

In the apparatus for detecting the rotative velocity of the reel table of the tape recorder according to the above embodiment, the transmission gear is formed to the lower portion of the reel table, and the prescribed pulse signal is supplied from the rotary switch in accordance with the rotation of the transmission gear to be recognized by the microcomputer, thereby detecting the rotation of the reel table. Here, the gear operates the reel table, and the rotation is detected by the switching connection. Therefore, the detecting function is accurately executed and the inferior rate is low while requiring cost lower than the system of employing the optical devices.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for detecting a rotative velocity of a reel table comprising:

a reel table installed on a deck of a tape recorder for being rotated in accordance with a driving of a driving motor to lead a travelling of a tape;

rotating means formed on a lower plane of said reel table for being rotated dependently on a rotation of said reel table, said rotating means including a transmission gear for transmitting the rotation of said reel table as a circular motion; and switching means for successively repeating connection and short operations in accordance with the rotation of said rotating means, and providing a result as a pulse signal, said switching means having a rotor which is brought into meshing engagement with said transmission gear and which is provided with a connecting projection having a plurality of contact points to one side thereof, and having a stator formed with a plurality of connection patterns for successively executing connection with and short from said connecting projection in accordance with the rotation of said rotor, in such a manner that a plane formed with said connecting projection of said rotor and a plane formed with said connection pattern of said stator are opposed to each other.

2. An apparatus for detecting a rotative velocity of a reel table as claimed in claim 1, wherein said rotating means is integrally formed with said reel table on said lower plane thereof.

3. An apparatus for detecting a rotative velocity of a reel table as claimed in claim 1, wherein said apparatus is provided to at least one of a take-up reel and a supply reel.

4. An apparatus for detecting a rotative velocity of a reel table as claimed in claim 1, wherein said rotor is formed with a fixing projection and said stator is formed with a fixing hole for fitting said fixing projection into said fixing hole to rotatably couple said rotor and stator.

5. An apparatus for detecting a rotative velocity of a reel table comprising:

a reel table installed on a deck of a tape recorder for being rotated in accordance with a driving of a driving motor to lead a travelling of a tape;

a transmission gear formed on a lower plane of said reel table for transmitting a rotation of said reel table as a circular motion; and a rotary switch including a rotor brought into meshing engagement with said transmission gear and having a connecting projection having a plurality of contact points to one side thereof, and a stator formed with a plurality of connection patterns for successively executing connection with and short from said connecting projection in accordance with the rotation of said rotor, wherein a plane formed with said connecting projection of said rotor and a plane formed with said connection pattern of said stator are oppose to each other, said rotor is formed with a fixing projection and said stator is formed with a fixing hole to fit said fixing projection into said fixing hole for rotatably connecting said rotor and stator.

6. An apparatus for detecting rotative velocity of a reel table as claimed in claim 5, wherein said transmission gear is formed with said reel table in a body on said lower plane thereof.

7. An apparatus for detecting rotative velocity of a reel table comprising:

a reel table installed on a deck of a tape recorder for being rotated in accordance with a driving of a driving motor to lead a travelling of a tape;

a transmission gear formed on a lower plane of said reel table in a body for transmitting the rotation of said reel table as a circular motion; and a rotary switch including a rotor brought into meshing engagement with said transmission gear and having a connecting projection having a plurality of contact points to one side thereof, and a stator formed with a plurality of connection patterns for successively executing connection with and short from said connecting projection in accordance with the rotation of said rotor, wherein a plane formed with said connecting projection of said rotor and a plane formed with said connection pattern of said stator are opposed to each other, said rotor is formed with a fixing projection and said stator is formed with a fixing hole to fit said fixing projection into said fixing hole for rotatably connecting said rotor and stator, wherein said rotative velocity of said reel table is detected as pulse signals generated by connection or short of said connecting projection and said connection patterns.

* * * * *